US007695650B2

(12) United States Patent
Bar-Yaakov et al.

(10) Patent No.: US 7,695,650 B2
(45) Date of Patent: Apr. 13, 2010

(54) FIRE RETARDANT FORMULATIONS

(75) Inventors: Yoav Bar-Yaakov, Lehavim (IL); Ita Finberg, Beer-Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 681 days.

(21) Appl. No.: 11/597,784

(22) PCT Filed: Jun. 9, 2005

(86) PCT No.: PCT/IL2005/000612

§ 371 (c)(1), (2), (4) Date: Nov. 27, 2006

(87) PCT Pub. No.: WO2005/120165

PCT Pub. Date: Dec. 22, 2005

(65) Prior Publication Data

US 2007/0228344 A1    Oct. 4, 2007

(30) Foreign Application Priority Data

Jun. 10, 2004  (IL) .................................... 162449

(51) Int. Cl.
*C09K 21/00* (2006.01)
*C08G 18/80* (2006.01)
*C08G 18/77* (2006.01)
*C08G 18/28* (2006.01)
*C08K 5/00* (2006.01)
*C04B 28/14* (2006.01)
*C08K 3/30* (2006.01)
*C08J 3/20* (2006.01)
*C08J 3/22* (2006.01)
*C08K 9/00* (2006.01)

(52) U.S. Cl. .......................... 252/601; 252/609; 524/86; 524/115; 524/210; 524/423; 523/351; 523/205

(58) Field of Classification Search ................ 252/601, 252/609; 523/351, 205; 524/210, 423
See application file for complete search history.

(56) References Cited

U.S. PATENT DOCUMENTS

| 3,843,650 | A |  | 10/1974 | Pews et al. |
| 4,187,377 | A |  | 2/1980 | Narisawa et al. |
| 4,355,126 | A |  | 10/1982 | Haaf et al. |
| 4,386,203 | A |  | 5/1983 | Naarmann et al. |
| 5,284,604 | A |  | 2/1994 | Nishibori et al. |
| 5,432,219 | A |  | 7/1995 | Shiueh et al. |
| 5,681,875 | A | * | 10/1997 | Huang et al. ................. 523/351 |
| 2003/0220422 | A1 | * | 11/2003 | Kaprinidis .................... 524/86 |
| 2004/0072929 | A1 |  | 4/2004 | De Schryver |
| 2004/0092642 | A1 |  | 5/2004 | Onishi |
| 2004/0137251 | A1 |  | 7/2004 | Davis et al. |

FOREIGN PATENT DOCUMENTS

| EP | 0735084 |  | 10/1996 |
| JP | 04325564 |  | 11/1992 |
| JP | 11323064 | * | 5/1998 |
| JP | 11-323064 |  | 11/1999 |
| JP | 11323064 | * | 11/1999 |
| JP | 11323064 A | * | 11/1999 |
| JP | 2003128860 |  | 5/2003 |
| WO | 03046071 |  | 6/2003 |

OTHER PUBLICATIONS

Fisk et al Prioritization of Flame Retardants for Environmental Risk Assessment 2003 : Environment Agency Document: p. 11 {http://ec.europa.eu/environment/waste/stakeholders/industry_assoc/ebfrip/annex2.pdf}.*
Supplementary European Search Report, 3 pages, completed Sep. 15, 2009.

* cited by examiner

*Primary Examiner*—James Seidleck
*Assistant Examiner*—Aaron Greso
(74) *Attorney, Agent, or Firm*—Roach Brown McCarthy & Gruber, P.C.; Kevin D. McCarthy

(57) ABSTRACT

A fire-retardant formulation for styrene-containing polymers comprising tris(2,4,6-tribromophenoxy)-s-triazine (FR-245), antimony trioxide and polytetrafluoroethylene (PTFE), wherein the bromine concentration in said fire-retardant formulation is from about 9.0 to about 10.5 wt. %, said antimony trioxide concentration being lower than about 3.2 wt. %.

11 Claims, No Drawings

FIRE RETARDANT FORMULATIONS

FIELD OF THE INVENTION

The present invention relates to improved fire-retardant formulations. More specifically, the present invention relates to improved fire-retardant formulations for styrene polymers and more particularly for High Impact Polystyrene (HIPS) and Acrylonitrile-Butadiene-Styrene terpolymer (ABS).

BACKGROUND

Styrenic resins are widely used in many applications including those where fireproof materials are necessary. Such applications include for example TV cabinets, in which there is a need for the incorporation of fire-retardants (FR) in styrene-polymeric materials.

Traditional FRs for these applications include, inter alia, decabromodiphenyl oxide and more recently tris(2,4,6-tribromophenoxy)-s-triazine the latter known as FR-245. The advantages of FR-245 are good balance of properties, high level of mechanical properties, high processing heat stability, good light stability, high melt flow and no blooming. However, unlike formulations based on decabromodiphenyl oxide, the formulations based on FR-245 tend to induce long after glow time. This effect is enhanced when carbon black is added to the formulation. JP 11323064 discloses the incorporation of fire-retardant formulation comprising tris(2,4,6-tribromophenoxy)-s-triazine known as FR-245, tris(3-bromo-2,2(bromomethyl)propyl)phosphate known as FR-370, antimony trioxide ($Sb_2O_3$) and PTFE (polytetrafluoroethylene) in rubber reinforced polystyrene also known as HIPS, wherein the bromine content, the main component responsible for fire retardation, is between 9.5 and 11 wt. % and wherein antimony trioxide, serving as a synergist, is between 3.5 and 3.7 wt. %.

This formulation is claimed to successfully meet the requirement of UL-94 class V-0 according to the flammability tests, where five specimens are ignited, twice each, and the fulfillment of 5 requirements is necessary to pass a UL-94 V-0 standard, namely:

1. Maximum after flame time $\leq 10$ seconds (for each ignition).

2. Total after flame time of 10 ignitions less or equal to 50 seconds.

3. Maximum after flame+after glow time less or equal to 30 seconds.

4. None of the test specimens burns or glows up to the holding clamp.

5. No cotton ignition by dripping.

UL-94V is UL (Underwriter Laboratories) Standard for Safety for Tests for Parts in Devices and Appliances.

A fire-retardant formulation containing FR-245 with 11.5 wt. % Br, 0.08 wt. % PTFE and 3.5 wt. % antimony trioxide is also rated UL-94 V-0, but reducing the bromine content to 10.5 wt. % Br results in derating to UL-94 V-1 because of long afterglow time. JP 11323064 overcomes this problem by introducing FR-370 to the formulation, which effectively reduces that time, while keeping relatively low levels of bromine-based fire-retardant.

Although JP 11323064 states that incorporation of FR-370 in the formulation allows maintaining low levels of bromine, which enhances technical properties of articles incorporating it and leads to cost-effective FR formulations, the inventors of the present invention note that FR-370 is a very expensive material and its use in fire-retardant formulations offers a high-cost non-economical solution for reducing or eliminating the afterglow phenomenon and for achieving V-0 flammability test rating.

SUMMARY OF THE INVENTION

The applicants have surprisingly found that by lowering the concentration levels of antimony trioxide to certain ranges while maintaining low levels of bromine, a fire-retardant formulation that essentially meets the requirement UL-94 class V-0 standards is achieved without evoking the need for high-cost or other materials. In particular, it has also been found that even when incorporating additives to the formulation as carbon black pigment those concentration ranges of the respective components still allow to successfully pass the standard flammability tests.

It is therefore an object of the present invention to provide a fire-retardant formulation that essentially meets the requirement standard according to the flammability tests.

It is yet another object of the present invention to provide a pigmented fire-retardant formulation that essentially meets the requirement standard according to the flammability tests.

Still another object of the present invention is to provide a fire-retardant formulation with improved technical and mechanical properties.

Still another object of the present invention is to provide a fire-retardant formulation that is cost-effective.

Still another object of the present invention is to provide a fire-retarded styrene-containing polymer for injection molding or extrusion essentially comprising said fire-retardant formulation.

Still another object of the present invention is to provide fire-retarded styrene-containing polymer that may be HIPS or ABS.

This and other objects of the invention will become apparent as the description proceeds.

DETAILED DESCRIPTION OF THE INVENTION

The present invention provides a fire-retardant formulation that meets the requirement UL-94 V-0 standard according to the flammability tests and which is also cost-effective.

According to the present invention the formulation comprises FR-245, antimony trioxide, PTFE and optionally carbon black pigment, in which the acceptable concentrations of bromine range between about 9.0 and about 10.5 wt. % and those of antimony trioxide range between about 1.8 and about 3.2 wt. %.

Styrene rubber reinforced polymers containing fire-retardant formulations (FR-HIPS) are often required to possess a black or gray color. This is achieved by the incorporation of carbon black, a preferred pigment, to these formulations. However, a side-effect of carbon black when introduced in a fire-retardant formulation is long period of time afterglow effect, where the formulation comprises essentially the same components having the same concentrations as disclosed in JP 11323064, excluding the presence of FR-370.

In addition to the polystyrenic polymer, halogen based fire retardant, antimony oxide, PTFE and the carbon black, there can be present in the formulation conventional additives in their conventional amounts. Examples of such additives are: fillers, pigments, dyes, impact modifiers, UV stabilizers, antioxidants, processing aids, nucleating agents, lubricants and the like.

The flame retarded formulations may be shaped into the final object by processes that are well known to the person skilled in the art; non limiting examples of such processes are: injection molding, extrusion, press molding, vacuum forming, etc.

Examples

The present invention will now be described in more detail with Examples and Reference Examples.

Tables 1-3 below summarize the materials used for the preparation of the test samples as well as the methods and conditions for their preparation. Flammability was tested according to UL-94V.

TABLE 1

Materials

| TRADE NAME | GENERAL INFO |
|---|---|
| HIPS | Styron 472 ex Dow Chemical |
| ABS | Magnum 3404 ex Dow Chemical |
| Antimony trioxide | ACC-BS ex Antraco |
| FR-245 ex DSBG | Tris(2,4,6-tribromophenoxy)-s-triazine |
| F-3020 ex DSBG | Endcapped brominated epoxy oligomer (MW 2,000) |
| FR-1210 ex DSBG | Decabromodiphenyl oxide |
| Carbon Black | PSB 183 ex Hubron manufacturing division limited |
| PTFE | Hostaflon 2071 ex Dynon-fine powder (500μ) |

*Antimony trioxide is added as 80% concentrate in polystyrene carrier.
*Carbon black is added as 35% concentrate in polystyrene carrier.

Compounding

All formulations were prepared under the same conditions. The components are weighed on Sartorius semi-analytical scales with consequent manual mixing in plastic bags. All the components are introduced into an extruder via K-SFS 24 gravimetric feeding system ex. K-Tron.

Compounding is performed in a co-rotating twin-screw extruder ZE25 ex Berstorff with L/D=32. The compounding conditions are presented in Table 2. The extruded strands are pelletized in pelletizer 750/3 ex Accrapak Systems Limited.

The obtained pellets are dried in a circulating air oven ex Heraeus Instruments at 75° C. for 4 hours.

TABLE 2

Compounding conditions

| PARAMETER | UNITS | Set values |
|---|---|---|
| Feeding zone temperature ($T_1$) | ° C. | no heating |
| $T_2$ | ° C. | 160 |
| $T_3$ | ° C. | 230 |
| $T_4$ | ° C. | 230 |
| $T_5$ | ° C. | 230 |
| $T_6$ | ° C. | 230 |
| $T_7$ | ° C. | 200 |
| $T_8$ | ° C. | 230 |
| $T_9$ | ° C. | 230 |
| Temperature of melt | ° C. | 230 |
| Screw speed | RPM | 300 |

Injection Molding

Test specimens were prepared by injection molding in an Allrounder 500 150 ex. Arburg. All test specimens were prepared under the same conditions. The injection molding conditions are presented in Table 3.

TABLE 3

Injection molding conditions

| PARAMETER | UNITS | Set values |
|---|---|---|
| $T_1$ (Feeding zone) | ° C. | 180 |
| $T_2$ | ° C. | 200 |
| $T_3$ | ° C. | 230 |
| $T_4$ | ° C. | 230 |
| $T_5$ (nozzle) | ° C. | 230 |
| Mold temperature | ° C. | 40 |
| Injection pressure | bar | 500 |
| Holding pressure | bar | 250 |
| Back pressure | bar | 20 |
| Injection time | sec | 0.1 |
| Holding time | sec | 10.0 |
| Cooling time | sec | 5.0 |
| Mold closing force | kN | 500 |
| Filling volume (portion) | ccm | 21 |
| Injection speed | ccm/sec | 10 |

Conditioning

Prior to UL-94 testing test specimens are conditioned at 70° C. for 168 hours and at 23° C. for 168 hours.

Compositions and flammability test results are presented in Table 4 for HIPS compositions and in Table 5 for ABS compositions.

TABLE 4

HIPS compositions and flammability test results

| Components | Units | Reference Example 1 | Reference example 2 | Reference example 3 | Reference example 4 | Reference example 5 | Reference example 6 | Reference example 7 | Reference example 8 | Reference example 9 |
|---|---|---|---|---|---|---|---|---|---|---|
| HIPS Styron 472 | % | 82.5 | 81.5 | 84.4 | 84.5 | 83.4 | 79.2 | 78.2 | 81.5 | 81.6 |
| FR-245 | % | | | | | | 17.2 | 17.2 | 14.9 | 14.9 |
| FR-1210 | % | 13.9 | 13.9 | 12.0 | 12.0 | 12.0 | | | | |
| F-3020 | % | | | | | | | | | |
| Antimony trioxide | % | 3.5 | 3.5 | 3.5 | 3.5 | 3.5 | 3.5 | 3.5 | 3.5 | 3.5 |
| PTFE Hostaflon 2071 | % | 0.1 | 0.1 | 0.1 | | 0.1 | 0.1 | 0.1 | 0.1 | |
| Carbon Black | % | | 1.0 | | | 1 | | 1.0 | | |
| Bromine calculated | % | 11.5 | 11.5 | 10 | 10 | 10 | 11.5 | 11.5 | 10 | 10 |
| Flammability UL-94V at 1.6 mm | | | | | | | | | | |
| Max flaming time | sec | 2 | 1 | 2 | 4 | 1 | 2 | 1 | 2 | 3 |
| Total flaming time | sec | 10 | 9 | 10 | 17 | 10 | 11 | 7 | 12 | 11 |

TABLE 4-continued

HIPS compositions and flammability test results

| | | | | | | | | | | |
|---|---|---|---|---|---|---|---|---|---|---|
| Max after glow time | sec | 12 | 0 | 0 | 0 | 11 | 20 | 36 | 31 | 0 |
| Max after glow + after flame time | sec | 13 | 1 | 1 | 1 | 12 | 22 | 36 | 31 | 1 |
| Specimens dripped | num | 0 | 0 | 0 | 3 | 0 | 0 | 0 | 0 | 5 |
| Cotton ignition | num | 0 | 0 | 0 | 2 | 0 | 0 | 0 | 0 | 5 |
| Sample burned up to the holding clamps | num | 0 | 0 | 0 | 0 | 0 | 0 | 0 | 0 | 0 |
| Rating | | V-0 | V-0 | V-0 | V-2 | V-0 | V-0 | V-1 | V-1 | V-2 |

| Components | Units | Reference example 10 | Reference example 11 | Reference example 12 | Reference example 13 | Reference example 14 | Reference example 15 | Example 1 | Example 2 | Example 3 |
|---|---|---|---|---|---|---|---|---|---|---|
| HIPS Styron 472 | % | 80.5 | 80.8 | 83.0 | 81.6 | 81.2 | 79.6 | 81.0 | 81.5 | 80.6 |
| FR-245 | % | 14.9 | 14.9 | 14.9 | 14.9 | 14.9 | 10.4 | 14.9 | 14.9 | 10.4 |
| FR-1210 | % | | | | | | | | | |
| F-3020 | % | | | | | | 5.4 | | | 5.4 |
| Antimony trioxide | % | 3.5 | 3.2 | 1.0 | 2.5 | 2.5 | 3.5 | 3.0 | 2.5 | 2.5 |
| PTFE Hostaflon 2071 | % | 0.1 | 0.1 | 0.1 | 0.02 | 0.4 | 0.1 | 0.1 | 0.1 | 0.1 |
| Carbon Black | % | 1 | 1.0 | 1.0 | 1.0 | 1.0 | 1.0 | 1.0 | 1.0 | 1.0 |
| Bromine calculated | % | 10 | 10 | 10 | 10 | 10 | 10 | 10 | 10 | 10 |
| Flammability UL-94V at 1.6 mm | | | | | | | | | | |
| Max flaming time | sec | 1 | 3 | 78 | 6 | 1 | 3 | 2 | 7 | 4 |
| Total flaming time | sec | 9 | 13 | 338 | 26 | 7 | 12 | 12 | 16 | 18 |
| Max after glow time | sec | 54 | 35 | 0 | 31 | 45 | 35 | 21 | 2 | 22 |
| Max after glow + after flame time | sec | 55 | 37 | 78 | 33 | 46 | 38 | 22 | 2 | 24 |
| Specimens dripped | num | 0 | 0 | | 3 | 0 | 0 | 0 | 0 | 0 |
| Cotton ignition | num | 0 | 0 | | 3 | 0 | 0 | 0 | 0 | 0 |
| Sample burned up to the holding clamps | num | 0 | 0 | 4 | 0 | 0 | 0 | 0 | 0 | 0 |
| Rating | | V-1 | V-1 | HB | V-2 | V-1 | V-1 | V-0 | V-0 | V-0 |

Table 4 above summarizes several composition and flammability test results of prior art related fire-retardant formulations as well as of formulations relating to the present invention. From this table it is clearly seen that:

(a) Formulations (Reference Example-6) based on JP 11323064 pass successfully the V-0 flammability test, but introducing 1 wt. % carbon black pigment (Reference Example-7), results in derating to V-1 due to long afterglow time.

(b) In fire-retardant FR-1210 (decabromodiphenyl oxide) based formulations—Reference Examples 1-5—the first two formulations substantially having the same bromine, antimony trioxide and PTFE concentrations as in Reference Examples 6 and 7 pass V-0 tests, even when containing carbon black pigment (Reference Example 2). Reducing bromine content to 10 wt. % and then further elimination of PTFE from this formulation result in V-0 and V-2 rating, respectively (Reference Example 3 and Reference Example 4), the latter is due to burning drops ignited cotton effect. Addition of carbon black to Reference Example 3 does not derate the formulation and it passes V-0 tests (Reference Example 5). It should be noted that the antimony trioxide remains essentially unchanged in all those formulation variations.

(c) Reference Example 8, Reference Example 9, Reference Example 10 and Example 2 to Example 3 relate to FR-245 containing formulations having varying concentrations of the components Further reduction of FR-245 to 10 wt. % bromine while keeping the antimony trioxide concentration relatively high (Reference Example 8) results in derating to V-1. Omission of PTFE from this formulation (Reference Example 9) results in dripping with cotton ignition and V-2 rating. Further addition of carbon black to Reference Example 8 (Reference Example 10) results in long afterglow effect and a rating of V-1. However, reduction of antimony trioxide to 2.5 wt. % (Example 2) surprisingly improves flammability retardation and is rated V-0. Further reduction of antimony trioxide to 1 wt. % (Reference Example 12) results in total burning of the specimen up to the clamps and in a HB rating. The upper concentration limit of antimony trioxide is tested in Reference Example 11 vs. Example 1; at antimony trioxide concentration of 3.2 wt. % the formulation is rated V-1 because of long after glow time (Reference Example 11); at antimony trioxide concentration of 3.0 wt. % the formulation is rated V-0 (Example 1). The concentration limits of PTFE are tested in formulations Reference Example 13, 0.02 wt. %, and Reference Example 14, 0.4 wt. %. In the first an effect of burning drops ignited cotton leads to V-2 rating. The second is rated V-1 due to long afterglow time.

(d) The employment of both FR-245 and F-3020 (MBEO endcapped brominated epoxy resin) as the bromine fire-retardants, the first contributing about 7 wt. % and the second about 3 wt. % of the bromine content, leads to long afterglow time (Reference Example 15) when incorporating 3.5 wt. % antimony trioxide, i.e. V-1 rating, and to successful results (Example 3) when lowering antimony trioxide concentration to 2.5 wt. %, i.e. V-0. These two results are similar to the ones achieved for formulations containing only FR-245, i.e. Reference Example 10 and Example 2, and further stress the optimal relation between bromine fire-retardant and antimony trioxide synergist contents.

TABLE 5

| Components | Units | Reference example 16 | Example 4 |
|---|---|---|---|
| ABS compositions and results of flammability results | | | |
| ABS Magnum 3404 | % | 80.0 | 81.0 |
| FR-245 | % | 14.9 | 14.9 |
| Antimony trioxide | % | 4.0 | 3.0 |
| PTFE Hostaflon 2071 | % | 0.1 | 0.1 |
| Carbon Black | % | 1.0 | 1.0 |
| Bromine calculated | % | 10 | 10 |
| Flammability UL-94V at 1.6 mm | | | |
| Max flaming time | Sec | 5 | 7 |
| Total flaming time | Sec | 16 | 29 |
| Max after glow time | Sec | 36 | 21 |
| Max after glow + after flame time | Sec | 38 | 23 |
| Specimens dripped | Num | 0 | 0 |
| Cotton ignition | Num | 0 | 0 |
| Sample burned up to the holding clamps | Num | 0 | 0 |
| Rating | | V-1 | V-0 |

Table 5 demonstrates that the same effects, which are observed in HIPS formulations, are also applied in ABS based formulations.

HIPS and ABS containing fire-retardant formulations containing FR-245 or a combination of FR-245 and BEO's at low bromine content and with the incorporation of carbon black do not pass UL-94 V-0 because of long after glow time. It is surprisingly found that at low antimony trioxide concentrations it is possible to pass UL-94 V-0 and get economic cost-effective formulations with good mechanical, thermal and processing properties.

While examples of the invention have been described for purposes of illustration, it will be apparent that many modifications, variations and adaptations can be carried out by persons skilled in the art, without exceeding the scope of the claims.

We claim:

1. A fire-retardant formulation for styrene-containing polymers comprising tris(2,4,6-tribromophenoxy)-s-triazine (FR-245), antimony trioxide and polytetrafluoroethylene (PTFE), wherein the bromine concentration in said fire-retardant formulation is from 9.0 to 10.5 wt. %, said antimony trioxide concentration being lower than about 3.0 wt. % while excluding tris(tribromoneopentyl)phosphate (FR-370) from said formulation.

2. The fire-retardant formulation of claim 1, wherein the bromine concentration is about 10 wt. %, and the PTFE concentration is about 0.1 wt. %.

3. The fire-retardant formulation of claim 1, wherein the bromine concentration is about 10 wt. %, the antimony trioxide concentration is about 2.5 wt. %, and the PTFE concentration is about 0.1 wt. %.

4. A fire-retardant formulation according to claim 1, further comprising carbon black.

5. The fire-retardant formulation of claim 4, wherein the carbon black concentration is from 0.3 to 2 wt. %.

6. The fire-retardant formulation of claim 4, wherein the bromine concentration is about 10 wt. %, the PTFE concentration is about 0.1 wt. % and the carbon black concentration is about 1.0 wt. %.

7. The fire-retardant formulation of claim 4, wherein the bromine concentration is about 10 wt. %, the antimony trioxide concentration is about 2.5 wt. %, the PTFE concentration is about 0.1 wt. % and the carbon black concentration is about 1.0 wt. %.

8. The fire-retardant formulation according to claim 1, further comprising brominated epoxy resin (BEO) or endcapped brominated epoxy resin (MBEO).

9. The fire-retardant formulation of claim 4, further comprising brominated epoxy resin (BEO) or endcapped brominated epoxy resin (MBEO).

10. The fire-retardant formulation of claim 8, wherein said bromine of said BEO or MBEO is at least 3 wt. %.

11. The fire-retardant formulation of claim 9, wherein said bromine of said BEO or MBEO is at least 3 wt. %.

* * * * *